3,690,833
AUTOMATED FLUIDS ANALYZER HAVING
SELECTIVELY INTERRUPTED FLOW
Andres Ferrari, Dover, Mass., assignor to Damon
Corporation, Needham Heights, Mass.
Filed May 4, 1970, Ser. No. 34,104
Int. Cl. G01n 21/16, 33/16
U.S. Cl. 23—230 R
28 Claims

ABSTRACT OF THE DISCLOSURE

An automatic chemical analyzer of the concentrations of different constituents in minute samples of fluid moves a sample along a processing path with discontinuous flow such that the sample dwells essentially stationary in the analyzer for a portion of the analysis time. A fluid directing mechanism delivers the central portion of the processed sample to a photometer for measurement, and removes the rest of the processed sample, with whatever other fluids are present, from the processing path. Fresh wash liquid is flushed through the photometer to cleanse it between samples, which can be held stationary during measurement.

BACKGROUND OF THE INVENTION

This invention relates to the automatic analysis of each of a plurality of fluids to determine the amount of one and usually plural constituents in each fluid. The invention provides a novel method and apparatus for attaining this analysis in a processing path of unusually short length and with minimal contamination of the sample and of the analysis equipment. These capabilities enable the new analyzer to perform multiple constituent determinations with a minute volume of sample.

Analyzers embodying the invention can, for example, perform multiple-constituent examinations of blood and other body fluids. Another application of the invention is in the automated pollution-monitoring analysis of fluids such as industrial wastes.

An analyzer embodying the invention employs the conventional analysis technique of reacting an aliquot of the fluid sample to produce a reaction product in an amount that identifies the amount, and hence concentration, of a selected constituent in the fluid sample. A photometric detector responds to the amount of radiant energy which the reaction product absorbs to produce an electrical signal corresponding to the constituent concentration. There is a separate processing path for performing these operations on a different aliquot of the sample for each constituent being investigated.

Some prior automatic fluid analyzers of this type advance the sample and other fluids along plural processing paths continually, and at a significant and generally uniform rate. The tubing forming each processing path accordingly is made sufficiently long to contain the continuously-advancing fluids for the required analysis time.

Further, all the processing paths are made essentially uniformly long so that all the processed aliquots of a given sample arrive at their measuring photometers within a single time interval and with the desired phasing. This requires that each processing path be as long as the path in which the most lengthy analysis is being performed. One manifestation of this prior analyzer construction is the presence of coils of delay tubing in fast-analysis paths to delay the aliquots therein while slower reactions proceed on other aliquots.

Another practice followed in prior analyzers of blood and other liquids that initially include proteinaceous materials, is to add an initial stage to the analyzer for the on-line, on-stream production of the protein-free filtrate required for the constituent analysis.

This on-line filtrate or like sample preparation not only adds to the processing path tubing length, but also produces only a small part of the sampling fluid available in the original specimen.

The net consequence of these and other constraints observed in prior art analyzers is that the processing paths are very long. This in turn requires relatively extensive precautions to cut down the extensive contamination that would otherwise occur between successive fluid segments in each processing path. One such precaution found in prior analyzers is the use of gas bubbles to segment a stream of liquid samples. The air segmentation is in addition to the introduction of segments of a wash liquid between samples. Also, a relatively large volume of wash liquid is needed to flush the long processing paths, which now are even longer in order to contain these volumes of wash liquid and segmenting gas.

The prior art has ameliorated some of these problems, in an effort to attain the desired analysis accuracy, by using large sample volumes. This of course diminishes the relative effect of a given amount of contamination. However, the large samples required for blood analysis, for example, are not readily obtained from the aged or the young; and they often are simply not available from small animals such as mice.

A further problem is that the prior art requirement for a relatively long processing path for each unit of analysis time makes it practically infeasible to carry a chemical reaction involved in the analysis close to completion. Instead, prior analyzers are restricted to operation with the reaction product produced after a reaction has progressed only part-way. This, in turn limits the measuring accuracy, and the number of constituent determinations that can be made, with a given volume of sample.

Accordingly, it is an object of this invention to provide a method and apparatus for the automated multiple-constituent analysis of fluids from minute samples.

Another object of the invention is to provide a fluid constituent analysis method and apparatus which require only comparatively short processing paths and yet are capable of reacting fluid samples for whatever times are desired. A further object is to provide such a method and apparatus which are accurate and economical.

Another object of the invention is to provide a method and apparatus of the above character that maintain successive samples essentially free from contamination without segmentation of each sample with fluids of the opposite phase.

It is also an object of the invention to provide for the economical and accurate automated multiple-constituent analysis of fluids without the use of delay coils and without use of on-line, on-stream separators for producing protein-free filtrates.

A further object is to provide automated constituent analysis of the above character and capable of accurate measurement of rate reactions.

It is also an object of this invention to provide a method and apparatus for the photometric analysis of fluids with high accuracy on an automated basis. Another object is to provide such a method and apparatus of photometric measurement which minimize the contamination of the photometer flow cell and hence of the sample being measured.

Other objects of the invention will in part be obvious and will in part appear hereinafter.

The invention comprises the several steps and the relation of one or more of such step with respect to the others, and the apparatus embodying the features of construction, combination of elements and arrangement of parts adapted to effect such a step, as exemplified in the following detailed disclosure. The scope of the invention is indicated in the claims.

BRIEF DESCRIPTION OF FIGURES

For a fuller understanding of the nature and objects of the invention, reference should be had to the following detailed description, taken in connection with the accompanying drawings, in which.

BRIEF DESCRIPTION OF THE INVENTION

The invention provides an accurate and economical constituent analyzer of fluids which has short processing paths and yet is capable of analytically processing fluids with chemical reactions carried as far to completion as needed. The analyzer is particularly suited for the analysis of minute fluid samples, but the invention also provides improvements for the analysis of larger, macrosamples.

In brief, the analyzer processes minute samples in unusually short processing paths of tubing or other conduit by advancing the sample aliquots along the processing paths with discontinuous motion. That is, that analyzer draws in a fluid sample, and advances the sample aliquots along the processing paths, with a program of discontinuous motions in which the sample stream is intermittently advanced at a significant rate and then held essentially stationary, or at least advanced at a very slow rate. The sequence of movements introduces the specified volumes of samples, reagents and other fluids, and provides time for the desired completion of the reactions that produce the constituent-measuring reaction products.

The analyzer can arranged to synchronize the operation of the different fluid-processing components on the basis of the time elapsed after each sample is introduced into the analyzer. However, according to a preferred practice of the invention, the analyzer has detectors arranged along the processing paths to sense the arrival of sample aliquots. The signals from these detectors operate analyzer components downstream from the detector in such a manner that the operations of these components are only loosely synchronized with the operations of the analyzer components upstream from the particular detector.

A further feature of the analyzer is that it directs to the constituent-measuring photometer only the central portion of each processed sample aliquot. Further, the analyzer flushes clean wash fluid through the photometer intermediate to the receipt of each such central sample portion. The net result is that the processed sample is measured with a high degree of purity and that this is achieved on a reliable automatic basis.

This is in marked contrast to the practice in prior analyzers of delivering all the processed samples together with the intervening liquids to the photometer. This prior operation introduces significant contamination to the photometer flow cell, and the cleaning efficacy of the intervening fluids is small due to the diffusion therein of prior samples during the flow through the long length of processing path tubing upstream from the photometer.

Illustrative of the impact of this invention in one commercial area is that a commercial blood analysis instrument embodying the invention processes a minute, less than drop-sized, sample of blood to measure the amount of a constituent therein with a processing path ten or more times shorter than a prior art continuously operating analyzer for the same purpose. The analyzer embodying the invention typically requires only three to five microliters of sample for each constituent determination, and can even operate with significantly less volume, such as one microliter per aliquot. This is in contrast to the prior art requirement for an aliquot many times larger. Moreover prior testers generally encounter increasing problems in processing a sample for more than eight to ten minutes total time from the intake of the sample through to the photometric measure of the resultant reaction product, whereas the new blood analyzer can, if desired, process a minute sample for the full twenty or more minutes required for the complete development of a reaction product.

DESCRIPTION OF THE ILLUSTRATED EMBODIMENT

Figure 1:
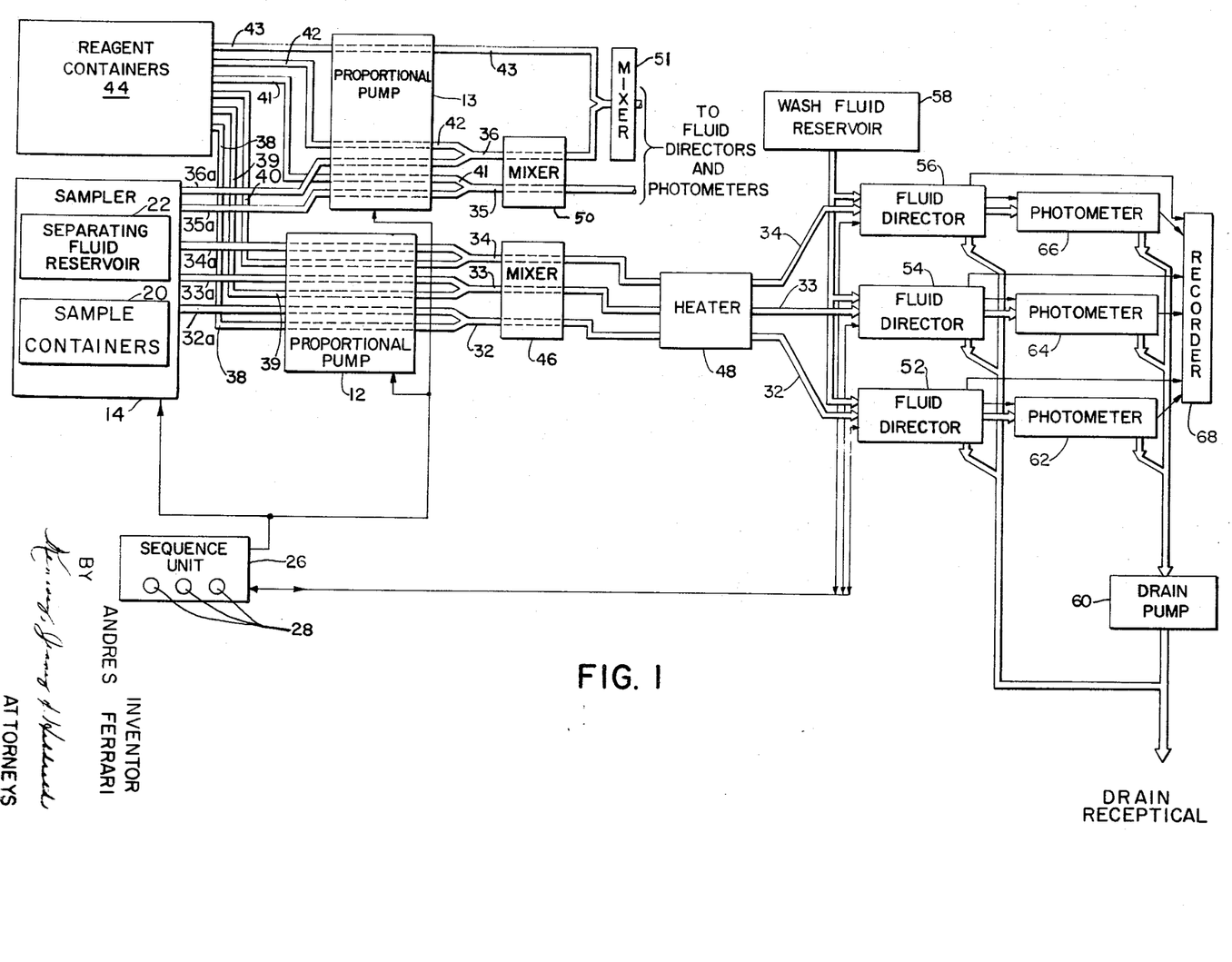
FIG. 1 is a block schematic representation of an automated fluid constituent analyzer embodying the invention.

Illustrative of the practice of this invention is an analyzer shown in FIG. 1 of five constituents in each of a succession of minute liquid samples, such as samples of protein-free blood filtrate. The analyzer has proportional pumps 12 and 13 that draw fluid from a sampler 14 by way of processing path input tubings 32a, 33a, 34a, 35a and 36a. Thus, five aliquots of each sample are drawn from the sampler. The sampler has containers 20 bearing the samples and a reservoir 22 of separating liquid inert to the blood samples. The sampler successively feeds an aliquot of a sample from a sample container to each input tubing, feeds separating liquid to each tubing, feeds a sample aliquot from the next sample container to each tubing, and then again feeds separating liquid to each input tubing. The operating times of the proportional pumps determine the amounts of each sample aliquot and of each segment of separating liquid drawn into each input tubing.

The analyzer operates basically under the timing control of a sequence unit 26. The sequence unit applies pump stopping and starting signals to the pumps 12 and 13 to provide the specified operating times. It also controls the operation of the sampler, e.g., incrementing to feed samples from successive sample containers and selecting sample or separating liquid. The sequence unit has control knobs and switches 28 adjustable to provide the sequence of sample intaking time, separating fluid intaking time and dwell times appropriate for the analysis being performed. The sequence unit 26 is illustrative of automatic control units in general. In fact, a programmed general purpose computer or other data processing equipment can provide the control operation.

The input tubings 32a, 33a and 34a feed through pump 12, and the processing path tubings 35a and 36a feed through pump 13. As also shown, pump 12 delivers reagents to the aliquots pumped through tubings 32a, 33a and 34a from the reagent containers 44 by way of tubings 38, 39 and 40, respectively. Likewise, pump 13 delivers further reagents from containers 44 to the sample aliquots in tubings 35a and 36a by way of tubings 41 and 42 respectively. Conventional constructions can be used for selecting and metering the reagents. The tubings 32, 33 and 34 carry the respective sample-reagent combinations to a mixer 46 and thence to an incubating heater 48, typically of the bath type. As discussed further below, the sample-reagent mixtures are maintained in the processing path tubings 32, 33 and 34, and principally in the heater 48, for a time sufficient for the chemical reactions between the individual sample aliquots and the different reagents to proceed to the specified extent required for each constituent determination.

The tubings 32, 33 and 34 deliver the processed sample aliquots from the heater to separate photometers 62, 64 and 66, respectively, each by way of a fluid director 52, 54, 56. Each photometer measures the optical absorbance of the processed sample it receives, and delivers the resultant electrical signal to a recorder 68. The optical absorbance of each processed aliquot is a function of the concentration of constituent-identifying reaction product in the aliquot and hence the electrical signal from each photometer is the desired measure of one constituent in the sample being analyzed. After this measurement, the processed aliquot is delivered to a drain or other receptacle, illustratively by way of a drain pump 60.

The photometers can be of the differential type, and the recorder 68 is illustrative of chart, magnetic or paper tape, or other recorders, as well as of print-out devices such as a Teletype machine. Alternatively, the recorder can be a computer or other data-processing device.

With further reference to FIG. 1, each fluid director receives fresh wash fluid from a reservoir 58 and is connected to receive a synchronizing signal from the sequence unit 26. As discussed below in detail with reference to FIG. 2, each fluid director feeds only the central portion of each processed aliquot to the photometer. It diverts the end portions of each processed aliquot, i.e. the portions contiguous with separating liquid, and the separating liquid from the sample processing path to a drain.

The fluid director also delivers wash liquid from the reservoir 58 to the photometer connected with it. This latter operation flushes the photometer flow cell with fresh wash liquid prior to each delivery of a processed sample aliquot to the flow cell.

A further feature of the flow director and photometer is that the processed aliquot is held stationary in the photometer flow cell during the measuring time. One advantage of having the sample stationary during measurement is that the same single photometer can provide several successive measurements on the same sample, thereby measuring a rate-reaction with ease and accuracy. U.S. patent application Ser. No. 884,923 for Photometric Flow Cell Having Flexible Optical Conductors, assigned to the assignee hereof, describes a photometer well suited for use in the analyzer of FIG. 1.

With further reference to FIG. 1, the illustrated analyzer subjects the aliquots in tubings 35 and 36 to reactions that do not require incubation. Consequently, from a mixer 50, the sample-reagent mixture in tubing 35 is delivered directly to a fluid director and photometer suitably identical to those shown connected in the processing path tubings 32, 33 and 34. As a further illustration, after mixing in mixer 50, the sample-reagent mixture in tubing 36 is treated with a further reagent from tubing 43 and mixed further with a mixer 51. The resultant processed sample aliquot is then measured, illustratively with a further fluid director and photometer, not shown.

Accordingly, the tubings 35 and 36 are considerably shorter than the tubings 32, 33 and 34 that form processing paths in which the fluids are subjected to incubation in a heater. The additional processing path lengths of tubings 32, 33 and 34 are in the heater, to provide the sample aliquots and reagents with additional reaction time under elevated temperatures.

The components of the FIG. 1 analyzer for processing aliquots of sample to produce constituent-measuring reaction products are illustrative of chemical analyzing devices in general. An analyzer embodying the invention can be arranged with conventional skills to perform any one of countless different analysis chemistries appropriate for a particular constituent in a particular fluid sample. Also, the photometers are illustrative of measuring instruments for electromagnetic radiation in general, whether visible, infrared or ultraviolet. Further, although illustrated as processing a liquid sample and using liquid separators, the analyzer can operate with separating segments and samples of different fluid phases, i.e., with one or both being a gas.

Further in accordance with the invention, the proportional pumps 12 and 13 operate with equal-length and synchronized cycles, so all aliquots of a sample are delivered to their respective measuring elements, e.g. to a photometer by way of a fluid director, within a single and relatively brief time interval during which the aliquots of no other sample are measured. For example, when the analyzer draws in a new sample each minute, it is desirable to measure all the processed aliquots, and deliver the resultant signals to the recorder, within a single, one-minute interval. This timing of the resultant electrical signals simplifies the recorder logic required to correlate the many measurements made on one sample.

However, also in accordance with the invention, each processing path is of comparatively minimal length for the reaction being performed in it. In the illustrated analyzer this means that the paths provided by tubings 35 and 36, which perform constituent determinations requiring no incubation, are significantly shorter than the paths provided by tubings 32, 33 and 34, each of which performs a reaction requiring considerable incubation in the heater 48.

The analyzer of FIG. 1 attains these seemingly conflicting results by operating the pumps 12 and 13 with a succession of fluid advance—fluid dwell periods in each cycle. In the illustrated example, the pump 12 operates according to FIG. 3 waveform 112 and the pump 13 operates according to waveform 113. With reference first to waveform 112, in each operating cycle the sequence unit 26 operates the pump 12 to be ON, and the sampler 14 to feed a sample, during an initial ADVANCE portion 112a of the illustrated cycle. After aspiration of the desired amount of sample, the sequence unit switches the sampler, with or without stopping the pump as is convenient, to feed separating liquid. Accordingly the pump 12 next aspirates separating liquid into the inlet tubings 32a–36a during the cycle ADVANCE portion 112b.

Figure 3:
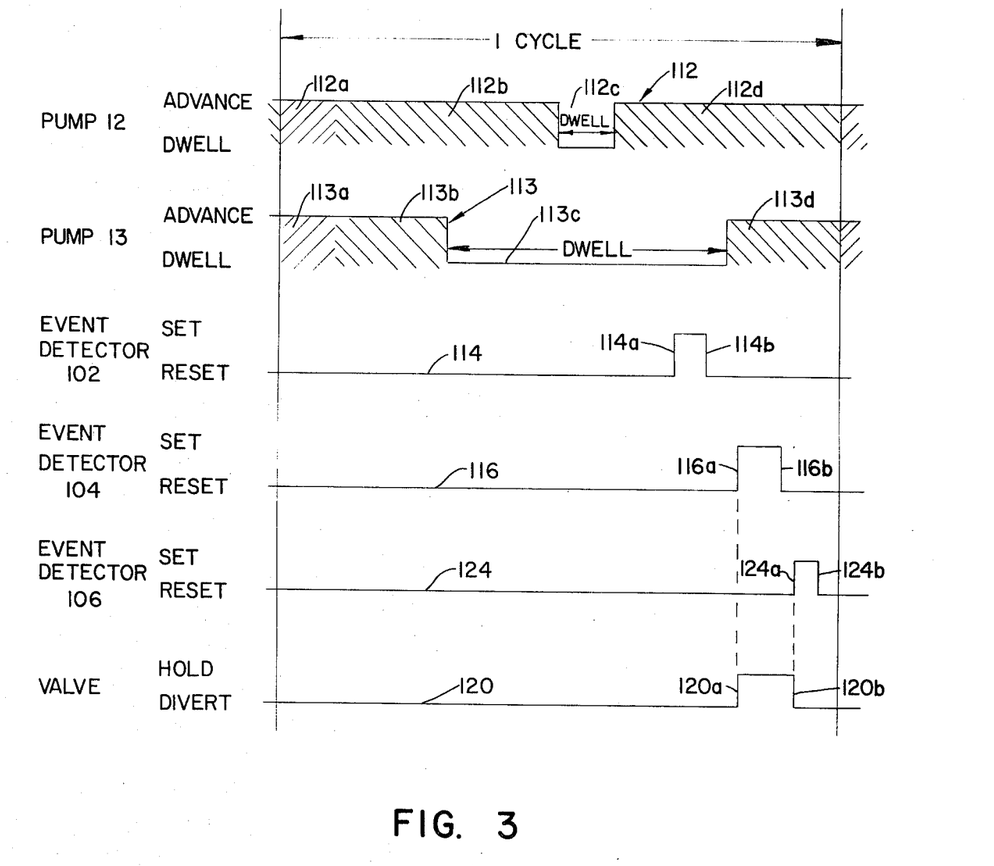
FIG. 3 is a set of timing waveforms illustrating the operation on the analyzer of FIG. 1 with the fluid director of FIG. 2.

During a cycle DWELL portion 112c, the sequence unit turns the pump OFF, or at least reduces its speed considerably so that fluids move along the processing paths at a slow creeping rate. Accordingly, the fluids in the processing path essentially dwell in the paths formed by tubings 32, 33 and 34 during the time of cycle portion 112c. This arrested-motion DWELL time allows the sample-reagent mixtures in these paths to react, without requiring additional tubing lengths in the paths.

Following this DWELL period, the sequence unit 16 again operates the pump 12 for a final cycle ADVANCE portion 112d to advance the fluids in tubings 32, 33 and 34, and consequently to draw in separating fluid again. Any fluid aspirated during the dwell time also is separating liquid.

The sequence unit 26 operates the proportional pump 13 with a similar cycle having, in succession, a fluid-advancing pump-on time for a sample aspirate ADVANCE portion 113a and then an ADVANCE portion 113b during which separating fluid is aspirated; a DWELL portion 113c; and finally another ADVANCE, separator aspirating, portion 113d. However, the DWELL portion 113c of pump 13 is longer, and the total ADVANCE time correspondingly shorter, than the corresponding portions of each cycle of the pump 12 operation. The difference between corresponding times of the two pumps is proportional to the difference between the lengths of the processing paths associated with pump 12 and those associated with pump 13. Further, this difference between the ADVANCE and DWELL times per cycle of the two pumps causes them to advance fluids by the same portion of their respective total path lengths. Consequently, both pumps deliver all aliquots of each sample to the photometers after the same number of cycles and hence within the desired short time interval. For this operation, of course, the paths through pump 12 have the same physical length and the paths through pump 13 have the same physical length.

Figure 2:
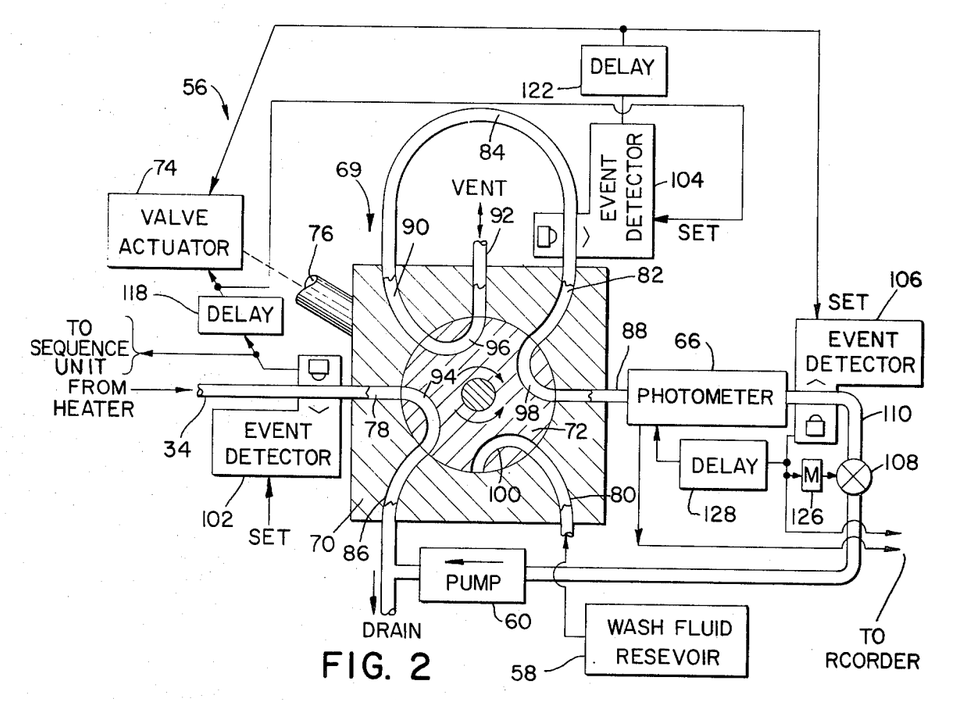
FIG. 2 and 2A show fluid directing apparatus for use in the analyzer of FIG. 1.

Turning to FIG. 2, it shows the details of the fluid director 56 and of the fluid control elements associated with it and with the associated photometer 66. This construction is typical of that for the other processing paths of the FIG. 1 analyzer. The fluid director is illustrated as having a rotary valve 69 formed with a stator 70, rotor 72, and an electromechanical valve actuator 74 coupled to the rotor shaft 76. The valve has two alternative positions, a DIVERT position shown in FIG. 2 and a HOLD position shown in FIG. 2A. The valve stator has an input port 78 connected to the processing path tubing 34 carrying processed sample from the heater 48 of FIG. 1. Another stator input port 80 receives wash fluid from the reservoir 58, and a third input port 82 is connected to an output end of a holding loop 84. The valve stator 70 also has an output port 86 feeding directly to the drain, a second output port 88 forming part of the sample processing path and feeding processed sample to the photometer 66, and a third output port 90 connected to the other, input end of the holding loop 84. The valve stator further has a vent port 92 open to the environmental or other desired atmosphere.

Figure 2A:
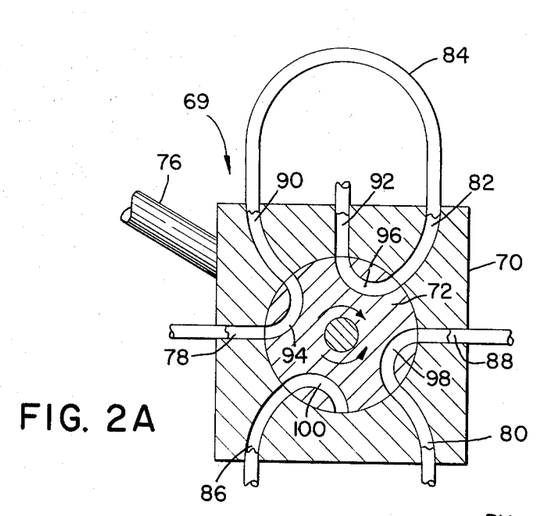

The valve rotor 72 has four circumferentially-spaced passages therein. As shown in FIGS. 2 and 2A and depending on the valve position, one passage 94 couples the input port 78 to either the output port 86 or the output port 90. A second passage 96 couples the vent port 92 to either the stator port 90 or 82, and a third passage 98 couples the output port 88 alternatively to the ports 82 and 80. A fourth passage 100 is arranged to block either the port 80 or the port 86.

The holding loop 84 is a section of tubing or other form of buffer-storing container with a volume capacity, including the volume of the valve stator port 90, corresponding to the volume of a sample aliquot plus the reagents combined with it in the analyzer processing path. As discussed below, the volume of the holding loop is generally less than this volume of the processed sample aliquot.

As also shown in FIG. 2, two event detectors 102 and 104 control the operation of valve 69. One event detector 102 is arranged to switch the valve to the sample-holding position shown in FIG. 2A, when the processed aliquot arrives at the valve input port 78. The other event detector 104 switches the valve to the DIVERT position of FIG. 2 when the processed aliquot arrives in the holding loop 84 at the valve port 82.

A third event detector 106 closes, for a brief fixed interval, a valve 108 in the photometer output tubing 110 when a processed aliquot arrives at the output side of the photometer 66.

Each illustrated event detector has a photometer monitoring the optical density of the fluid passing by it. Accordingly, the tubing or other conduit which each event detector monitors has an optically transparent section at the location of the event detector. Each event detector includes binary logic circuitry that can be switched to a "set" state. When in this state, the detector will respond to a selected change in optical absorbance of the fluid it is monitoring and switch to a "reset" state. The output signal from each detector has two different values, depending on whether the detector is set or reset. Alternative event detector constructions can be used, including those that sense changes in fluid dielectric constant, as well as ultra-violet, infra-red and other radiation absorbences.

The further construction and operation of the flow directing and measuring elements of the FIG. 1 analyzer are now described with further reference to FIGS. 2 and 2A and with reference to the timing diagram in FIG. 3.

After the initial start-up cycles and with the sequence unit 26 operating the proportional pumps 12 and 13 as depicted in FIG. 3 waveforms 112 and 113, one processed aliquot arrives at the fluid director during each cycle of analyzer operation and within a known time interval during the cycle. Accordingly the sequence unit sets the event detector 102 prior to that time interval. Transition 114a on waveform 114 in FIG. 3 shows this "setting" operation.

As indicated with FIG. 3 waveform 120, valve 69 is in the DIVERT position shown in FIG. 2 during the start of each cycle. Accordingly, the valve rotor passage 94 directs separator liquid arriving at the valve input port 70 from tubing 34 to the output port 86 and thence to the drain, thereby removing the separating fluid from the analyzer processing path.

When the trailing end of a segment of separating liquid passes by the event detector 102 and the processed aliquot arrives, the event detector, being in the set state, responds to this change in fluids in the output end of the tubing 34 and switches to the reset state. See waveform 114 transition 114b. The corresponding change in the output signal from the event detector is applied to the valve actuator 74, illustratively after a time delay produced by a delay circuit 118. The time delay is provided to maintain the valve in the DIVERT position for a further time sufficient to discharge to the drain the entirety of the segment of separating liquid and also the initial end portion of the processed sample aliquot, i.e., the forward end portion contiguous with the segment of separating liquid.

After the delay, the valve actuator 74 responds to the transition in the event detector 102 output signal and switches the valve to the HOLD position, FIG. 2A. Waveform 120 in FIG. 3 depicts the time during which the valve is in each of its two positions and the transition 120a is the change in valve position responsive to the arrival of a processed sample aliquot at event detector 102. The change in the event detector 102 output signal responsive to the arrival of a processed aliquot is also applied to the set input of the event detector 104, thereby readying this event detector to respond to the next change in fluid passing thereby in the loop 84. Waveform 116 shows this set operation of event detector 104 with transition 116a, which is illustrated as coinciding in time with the valve transition 120a of waveform 120.

With the valve 69 in the HOLD position, rotor passage 94 feeds the processed aliquot, minus the forward end portion, to the storage loop 84. Rotor passage 96 couples the loop 84 output end to the vent port 92 during this operation. When the event detector 104 senses the arrival of the leading edge of the processed aliquot at the end of the storage loop, the event detector switches to the reset state; transition 116b of waveform 116. The resulting transition in the event detector 104 output signal is applied to the valve actuator 74, causing it to return the valve to the DIVERT position; waveform 120 transition 120b. A delay circuit 122 can be connected in series with the event detector output signal to delay this valve transition to allow the processed aliquot not only to fill the holding loop 84 but also to fill the valve input port 82. The change in output signal from event detector 104 is applied also to set event detector 106, as indicated in waveform 124 with transition 124a.

The storage loop 84 and the valve stator port 90 coupled with it are arranged to contain a volume of fluid at least sufficient to fill the flow cell of photometer 66. This volume of fluid is less than the volume of each sample aliquot and the reagents mixed with it by the amount of the two end portions of processed aliquot which the valve 69 diverts to the drain with the separating fluid segments.

The motive force for advancing the central portion of the processed aliquot to the holding loop 84 preferably is provided by the FIG. 1 proportional pumps. Accordingly, the sequence unit turns the pumps ON to aspirate separating fluid, and thereby advance all the fluids in the analyzer processing paths, for at least the time while the valve is in the HOLD position. For this purpose, the set-to-reset transition output from the event detector 102 is fed back to the sequence unit, as shown in FIG. 2. The illustrated analyzer is arranged to coincide this HOLD pumping with the shortest of the ADVANCE periods, 112d, 113d at the end of each pump cycle. Accordingly, in responce to the set-to-reset signal from event detector 102, the sequence unit ensures that each pump is ON, providing ADVANCE operation.

Concurrent with the foregoing delivery of the central portion of a processed sample aliquot from the processing path tubing 34 to the holding loop 84 by the valve 69 in the HOLD position (FIG. 2), valve rotor passage 98 delivers wash fluid along this path from the reservoir 58 through the photometer to clean the photometer flow cell.

Also while the valve 69 is in the HOLD position, rotor passage 100 couples drain pump output port 86 to a dead end in the valve stator.

At this juncture, where the set-to-reset transition of the event detector 104 has operated the valve actuator to return the valve to the DIVERT position and has set the event detector 106, the holding loop contains the central portion of a processed sample aliquot, and the photometer has been flushed with clean wash fluid from the reservoir 58. With the valve now in the DIVERT position of FIG. 2, the end portion of the processed aliquot arriving at the valve along the processing path tubing 34, and the ensuing segment of separating fluid, are diverted from the processing path to the drain by way of the valve rotor passage 94. Also, the rotor passage 100 is coupled to the wash fluid input port 80 but the other end thereof is blocked.

Further, the rotor passage 96 couples the input end of the holding loop 84 by way of the valve port 90 to the vent port 92, and the rotor passage 98 couples the other end of the holding loop 84 to the photometer by way of the valve ports 82 and 88. Accordingly the drain pump 60, which operates continuously except as noted below, draws the central portion of processed aliquot stored in the buffer-storing loop 84 into the photometer.

As soon as the photometer fills with processed sample, the event detector 106 monitoring the fluid output from the photometer detects the arrival of the processed sample at the photometer output end. The detector accordingly switches to the reset state, waveform 124 transition 124b. The resulting transition in the event detector output signal swiches a monostable multivibrator 126 to the astable state. The output signal from the monostable circuit controls a valve 108 and in the astable condition it closes the valve, thereby blocking the drain pump from drawing fluid through the photometer. The valve 108 includes a solenoid or other actuator that responds to the multivibrator output signals.

Accordingly during the astable state of the multivibrator 126, processed sample is stationary in the photometer. This is the preferred condition for measuring the optical density of the processed sample and accordingly the set-to-reset transition from the event detector 106 actuates the photometer output circuit by way of a delay circuit 128. The delay circuit retards the photometer reading until the monostable multivibrator 126 has switched to the astable state, has blocked the valve 108, and allowed the liquid in the photometer to come to rest.

The resultant output signal from the photometer is applied to the recorder 68 of FIG. 1; in the illustrated system, the event detector 106 signal corresponding to the transition 124b is also applied to the recorder to condition it to respond to the signal from the photometer 66. Where a rate reaction is being measured, the processed sample is held in the photometer flow cell while several time-spaced measurements are made on it.

When the astable period of the monostable multivibrator ends, this circuit automaticaly returns to its stable state. The output signal therefrom in the stable state opens the valve 108, allowing the drain pump 60 to again draw fluid from and through the photometer flow cell. After all the processed sample is drained from the holding loop 84, the pump draws air from the valve vent port 92, through the photometer for the balance of the DIVERT time.

Figure 4:
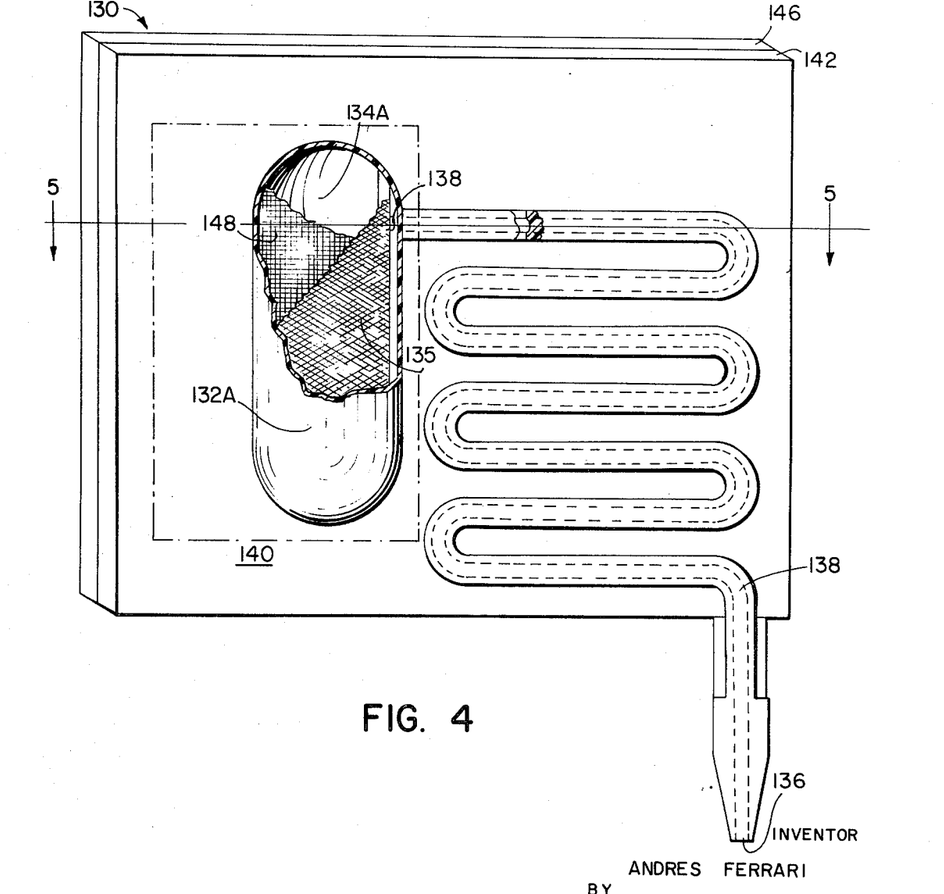
FIGS. 4 and 5 are, respectively, side and sectional views of specimen-preparing container apparatus advantageously used with an analyzer according to features of the invention.
Figure 5:
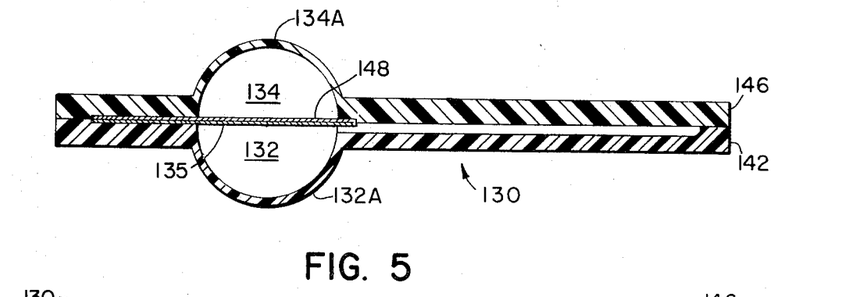

As noted above, the analyzer of FIG. 1 preferably receives samples ready for mixture with reagents to produce the desired constituent-measuring reaction products. This is in contrast to some prior art anlyzers of, for example, whole blood; for they receive specimens of whole blood, serum, or plasma and then produce the protein-free filtrates required for analysis in the processing path. FIGS. 4 and 5 shown a container 130 for collecting a specimen of whole blood or other liquid, and treating it with desired diluent, preservative or other regent. Moreover, the container 130 dialyzes the specimen to separate, in different compartments 132 and 134, the protein-free filtrate from the proteinaceous material.

Thus the container 130 automatically processes the specimen to develop the required sample, in the time after collection of the specimen during the storage and transportation to analysis. The container itself can hence be loaded into the FIG. 1 sample 14 and the protein-free sample withdrawn directly from compartment 134, with no further preparation or processing. In addition, red blood cells can be drawn from compartment 132 for hematology testing, and the supernatant fluid can also be drawn from this compartment for performing tests on the total protein.

The container 130 can be constructed as basically described in pending U.S. patent application Ser. No. 884,924 for Clinical Sample Container, assigned to the assignee hereof, and further has a semi-permeable dialyzing membrane 135 forming a common wall between the compartments 132 and 134. Accordingly, the container compartments 132 and 134 have collapsable and resiliently-restoring walls 132a and 134a for aspirating specimen from a nozzle 136 first into a calibrated collection tube 138 and then into compartment 132. A record panel 140 for carrying indicia identifying the specimen adjoins the container compartment portion.

The illustrated container 130 is constructed as a laminate of casing panels 142 and 146. Panel 142 is recessed with a channel that forms walls of the tubing 138 and the nozzle 136. The container wall 132a is also part of this panel. The other panel 146, identical to panel 142 except that is has no channel, closes the tubing and nozzle forming channel in panel 142. Also panel 146 includes the compartment wall 134a.

The two panels are bonded together as shown, with the dialyzing membrane 135 sealed between their mating faces to divide the bulbous space between the walls 132a and 134a into the two compartments 132 and 134.

The illustrated container 130 also has a mesh-like, porous membrane-backing plate 148 sandwiched with the membrane 135 between the casing panels and with one side of the plate 148 facing into the diffusate compartment 134. This backing plate supports the membrane, when the walls 132a and 134a are collapsed together, against damage from a pressure in compartment 132 far in excess of the pressure in compartment 134.

Although illustrated as a container for collecting blood and separating the protein-free filtrate from the proteinaceous constituents, the container 130 can also be used to provide other separations of micromolecular constituents from a mixture with constituents having larger, macromolecules. In each instance, the semi-permeable membrane is selected with pores of the diameter corresponding to the desired separation of molecule sizes.

It will thus be seen that the objects set forth above, among those made apparent from the preceding description, are efficiently attained. Since certain changes may be made in carrying out the above method and in the construction set forth without departing from the scope of the invention, it is intended that all matter contained in the above description or shown in the accompanying drawings shall be interpreted as illustrative and not in a limiting sense. It is also to be understood that the following claims are intended to cover all the generic and specific features of the invention herein described, and all statements of the scope of the invention which, as a matter of language, might be said to fall therebetween.

Having described the invention, what is claimed new and secured by Letters Patents is:

1. In the automated constituent analysis of a plurality of fluid samples in continuous fluid succession and wherein said samples are processed successively in a chemical processing path to manifest a detectable measure of said materail present in each sample, and are then subjected to measurement of said material constituent, the improvement comprising the step of
  (A) discontinuously moving each sample along said processing path, in succession with the others, with alternate times of advance along said path and of dwell at least nearly stationary, to provide with said dwell times further time for chemical reaction to produce said manifestation with minimal further physical length in said processing path.

2. The method defined in claim 1 wherein said processing path manifests a photometrically-detectable measure of said constituent, and comprising the further steps of
  (A) removing from said processing path, prior to said measurement, the end portions of each processed sample contiguous with other fluids and any non-sample fluids, and
  (B) delivering to a photometric flow cell only the portion of each processed sample between the two end portions thereof.

3. The method defined in claim 1 wherein said processing path manifests a photometrically-detectable measure of said constituent, and comprising the further step of
  (A) holding stationary in a photometric flow cell the central portion only of a processed sample intermediate the end portions thereof contiguous with other fluids, and
  (B) measuring said constituent in said central portion only of processed sample while stationary in said flow cell.

4. The method defined in claim 1 wherein said processing path manifests a photometrically-detectable measure of said constituent and delivers each processed sample to a photometric flow cell for said measurement, said method comprising the further step of
  (A) delivering said processed samples to said flow cell at timed intervals, and
  (B) introducing a fresh flow of cell-cleansing fluid to said processing path immediately upstream from said flow cell, and flushing it through said flow cell, between said timed intervals.

5. The methods defined in claim 1 comprising the further steps of
  (A) providing in said processing path intermediate each pair of successive samples a segment of sample-separating fluid providing a machine-detectable interface with each processed sample contiguous therewith,
  (B) detecting said interface in said processing path between each segment and the succeeding processed sample, and
  (C) selecting the timing of said measurement in response to said interface detection.

6. The method defined in claim 1 wherein said samples are liquids with constituents of comparatively small molecular size derived from liquid specimens also having constituents of large molecular size, and comprising the further steps of
  (A) delivering each said specimen to a first compartment of a container structure having also a second compartment in abutment with said first compartment and separated therefrom by a membrane permeable only to said constituents of small molecular size,
  (B) dialyzing said specimen in said container structure to deliver to said second compartment only said constituents of small molecular size, and
  (C) delivering said constituents in said second compartments to said processing path for said constituent analysis.

7. The method defined in claim 1 wherein said samples are liquids with constituents of comparatively small molecular size derived from liquid specimens also having constituents of large molecular size, and comprising the further steps of
  (A) delivering each said specimen to a first compartment of a container structure having also a second compartment in abutment with said first compartment and separated therefrom by a membrane permeable only to said constituents of small molecular size.
  (B) dialyzing said specimen in said container structure to deliver to said second compartment only said constituents of small molecular size, and
  (C) delivering constituents in a selected one of said compartments to said processing path for said constituent analysis.

8. The method defined in claim 1 comprising the further steps of
  (A) cyclically operating said processing path with fluid advancing and fluid dwell times in each cycle,
  (B) delivering to said path in each operating cycle a fluid sample and a segment of inter-sample separating fluid,
  (C) removing from said path, after said manifestation-producing processing and prior to said measurement, said fluid segments and the end portions of processed sample contiguous therewith,
  (D) delivering the central portion only of each processed sample, intermediate said end portions thereof, to means for performing said measurement, and
  (E) flushing said measurement means intermediate said delivery of processed sample thereto, with wash fluid introduced to said processing path subsequent to said segment removal.

9. The method defined in claim 8
  (A) further characterized in that said samples are liquids and said separating fluid is a liquid and said wash fluid is a liquid, and
  (B) comprising the further step of maintaining said processing path essentially free of gas not dissolved in said liquids therein.

10. The method defined in claim 8 in which the delivery of said central portion of processed sample to said measuring means includes the steps of
  (A) delivering said central portion only of processed sample to a buffer-storage container prior to said measurement thereof,
  (B) transferring said central portion of processed sample from said buffer-storage container to means for performing said measurement,
  (C) sensing the interfaces between each sample and separating fluid segments, and
  (D) controlling said buffer-storage and transfer of said central portion of processed sample in response to the sensing of said interfaces.

11. In the automated multiple-constituent analysis of each of a plurality of fluid samples in succession wherein plural processing paths receive aliquots of the same sample concurrently, and each processing path chemically processes each aliquot therein to manifest a detectable measure of a material constituent and subjects the processed aliquot to measurement of said material constituent, the improvement comprising the steps of
  (A) discontinuously advancing each sample aliquot along the corresponding processing path, in succession with aliquots of other samples, with alternate times of advance along said path and dwell therein at least nearly stationary,
  (B) providing different relative dwell and advance times for different ones of said processing paths according to the different times required for manifesting said measures of said different material constituents, and
  (C) measuring said material constituents in all the processed aliquots of the same sample within a time interval different from the measuring time interval for any other sample.

12. A method for analyzing the amounts of material constituents present in each of a plurality of liquid samples, said method comprising the steps of
   (A) delivering said samples in succession to process-paths with separate aliquots of each sample being delivered to separate processing paths,
   (B) delivering a segment of inter-sample separating liquid to each processing path between successive sample aliquots,
   (C) chemically processing each aliquot in the respective processing path to produce a reaction product identifying the concentration of a material constituent in that aliquot,
   (D) providing said paths with different lengths of tubing for containing aliquots therein during reaction with reagents to produce said reaction products according to the rates of the product-producing reagents,
   (E) sequencing said delivery and processing steps with alternate times of fluid advance along the processing paths and of fluid dwell in the processing paths,
   (F) selecting the relative lengths of said advance and dwell times for each processing path to complete the traversal of said different-length paths, and correspondingly to complete the production of said reaction products for all aliquots of a single sample, within a common time interval,
   (G) delivering each processed aliquot in each processing path to means unique to said path for measuring the amount of reaction product therein, and
   (H) delivering measuring-responsive signals from all said measuring means to recording means in a single time interval, so that said recording means receives said signals for all aliquots of a sample essentially concurrently.

13. The method defined in claim 12 comprising the further steps of
   (A) maintaining each processed aliquot stationary in the associated measuring means for a measuring time,
   (B) measuring the concentration of said reaction prodduct in said stationary aliquot, and
   (C) flushing said measuring means with wash liquid, introduced to said processing path immediately upstream from said measuring means, intermediate the delivery of processed aliquots thereto.

14. In automated fluid analyzing apparatus having chemical processing elements connected to form a fluid processing path for receiving fluid samples in continuous fluid succession and chemically processing each sample to manifest a detectable measure of a material constituent therein, and having measuring apparatus for receiving the processed samples and measuring said material constituent in each one, the improvement comprising
   (A) control means operating said processing elements to move each sample along said path, in succession with other samples, with discontinuous motion in which there are alternate times of fluid advance along said path and of dwell therein at least nearly stationary, to provide with said dwell times further time for chemical reaction producing said manifestation with minimal further physical length in said processing path.

15. The apparatus defined in claim 14 further comprising
   (A) measuring means receiving each said processed sample in succession for measuring the concentration of said constituent therein, and
   (B) valve means connected in said processing path to hold each processed sample stationary in said measuring means during a measuring interval.

16. Apparatus as defined in claim 14 further comprising
   (A) measuring means receiving each said processed sample in succession and measuring the concentration of said constituent therein, and
   (B) fluid directing means connected in said path intermediate said chemical processing elements and said measuring means, removing from said processing path the end portions of each processed sample contiguous with other fluids and any fluids other than processed samples, and delivering to said measuring means only the portion of each processed sample between two end portions thereof.

17. Apparatus as defined in claim 16 in which said fluid directing means is further arranged to introduce wash fluid into said path and flush it through said measuring means intermediate the delivery of each processed sample to said measuring means.

18. Apparatus as defined in claim 16
   (A) further comprising fluid sampling means for delivering to said processing path sample fluid and, alternatively, an inter-sample separating fluid,
   (B) in which said control means operates cyclically with at least one advance time and one dwell time in each cycle, said control means
      (1) operating said sampling means to deliver one sample and a segment of separating fluid to said processing path in each cycle, and
      (2) controls said fluid directing means for synchronizing said removing and delivering operations with said dwell and advance times.

19. In automated chemical analysis apparatus for measuring the concentration of a constituent in each of a plurality of fluid samples in succession, and having a fluid flow-guiding processing path including chemical analysis means for receiving said samples in succession, mixing at least one reagent with each sample to react therewith and produce detectable reaction product in a concentration corresponding to the concentration of said constituent in said sample, and including means for measuring the concentration of said reaction product in the processed sample, the further combination of
   (A) sampling means for delivering said samples to said processing path in succession with a segment of separating fluid contiguously between successive samples, and for advancing the sample-segment stream through said processing path,
   (B) fluid directing means connected in said processing path intermediate said analysis means and said measuring means for selectively diverting from said measuring means each separating fluid segment and the end portions of a processed sample contiguous therewith and delivering to said measuring means the central portion of each processed sample, between said end portions thereof, and
   (C) sequence control means for operating said sampling means to ultimately advance said stream along said path for an advance time and to hold said stream at least nearly stationary for a dwell time, and synchronizing the operation of said directing means with the portion of said advance time during which a sample is delivered to said analysis means.

20. Automated chemical analysis apparatus as defined in claim 19
   (A) in which said sequence control means includes interface detecting means arranged along said processing path for sensing the arrival in said processing path of the interface between a processed sample and a separating fluid segment,
   (B) further comprising valve means operated by said sequence control means in response to said interface detection for holding a processed sample stationary in said measuring means for a measuring interval.

21. Automated chemical analysis apparatus as defined in claim 19
   (A) further comprising fluid conduit means for receiving wash liquid, (B) in which said fluid directing means is connected with said conduit means and arranged selectively to introduce said wash fluid to said processing path and direct it to said measuring means, and (C) said sequence control means is further arranged to operate said directing means for said wash fluid introducing and directing operation intermediate the delivery of successive processed samples to said measuring means.

22. Automated chemical analysis apparatus as defined in claim 21 in which (A) said fluid directing means includes a buffer-storage fluid container, and (B) said control means operates said fluid directing means, in synchronism with the advance-dwell operation of said sampling means, to direct the central portion of a processed sample to said buffer-storage container concurrent with the delivery of said wash liquid to said measuring means, and, alternatively, to divert said end portions of processed sample and separating fluid from said path concurrent with the delivery of processed sample from said buffer-storage container to said measuring means.

23. In automatic chemical analysis apparatus for measuring the concentrations of plural constituents in each of a plurality of fluid samples in succession and having a separate processing path for each constituent to be determined, each said path having processing elements therein and including chemical analysis means for receiving an aliquot of each sample and for mixing at least one reagent for reaction therewith to produce a reaction product corresponding to the concentration of said constituent being determined therewith, each said path further including means for measuring said reaction product in said processed aliquot, the combination of (A) at least first and second groups of one or more of said processing paths, said paths of said first group producing said corresponding reaction products with with fast chemical reactions as compared to the reactions performed in said paths of said second group, and said paths of said first group being of equal physical length and shorter than the equal-length paths of said second group by an amount corresponding to the difference between said reaction times, (B) first and second proportional pump means forming part of said first and second groups of processing paths, respectively, and (C) cyclic sequence control means connected with said pumps and operating each pump to advance fluid discontinuously in the paths associated therewith with alternate times in each cycle of fluid advance and of dwell with at most little significant advance, said control means operating said first pump with advance times shorter than, and dwell times correspondingly longer than, the advance and dwell times of said second pump so that in each cycle each pump advances a sample aliquot by the same proportional length of the associated processing path.

24. In automatic chemical analysis apparatus for measuring the concentrations of plural constituents in each of a plurality of fluid samples in succession and having a separate fluid flow-guiding processing path for each constituent to be determined, each said path including chemical analysis means for receiving an aliquot of each sample and producing a reaction product therefrom corresponding to the concentration of said constituent being determined therewith, each said path further including means for measuring said reaction product in said processed aliquot, the combination of (A) at least first and second groups of one or more of said processing paths, said paths of said first group producing said corresponding reaction products with reaction times that are short compared to the reactions performed in said paths of said second group, and said paths of said first group being of equal physical length and shorter than the equal-length paths of said second group by an amount corresponding to the difference between said reaction times, (B) sampler means for delivering aliquots of the same sample to said paths in a first time interval different from the times of delivering aliquots of other samples, (C) first and second proportional pump means associated with first and second groups of processing paths, respectively, said pumps controlling the rate of aliquot intake into said paths and advance therealong, and (D) cyclic sequence control means connected with said pumps and operating each pump to advance fluid discontinuously in the paths associated therewith with alternate times in each less cycle of fluid advance and of dwell with at most little significant advance, said control means operating said first pump with advance times shorter than, and dwell times correspondingly longer than, the advance and dwell times of said second pump so that all said paths deliver the processed aliquots of the same sample to the measuring means therein within a single time interval as long as said first interval.

25. In the automated constituent analyses of a plurality of fluid samples for a plurality of constituents wherein each sample is divided into a plurality of aliquots and the aliquots of each sample are processed in a plurality of chemical processing paths to manifest a detectable measure of the constituents present in each sample, and are then subjected to measurements of said constituents, the improvement comprising the steps of (A) dividing each sample substantially simultaneously into a number of aliquots, (B) delivering said sample aliquots substantially simultaneously to said plurality of chemical processing paths, and (C) dicontinuously moving each sample aliquot through its processing path substantially in step with the other aliquots of the same sample in the other processing paths and in succession with the aliquots of other samples, with alternate times of advance along said path and of dwell at least nearly stationary, to provide with said dwell times further time for chemical reaction to produce said manifestation.

26. In automated fluid analyzing apparatus having chemical processing elements connected to form a plurality of fluid processing paths for receiving a plurality of aliquots of each of the succession of fluid samples and for chemically processing each aliquot of each sample to manifest a detectable measure of a material constituent therein, and having measuring apparatus for receiving the processed aliquots and for measuring said material constituent in each one, the improvement comprising (A) means for simultaneously dividing each sample into said plurality of aliquots, (B) means for supplying the aliquots of each sample substantially simultaneously to said plurality of fluid processing paths, and (C) means operating said processing elements to move the aliquots of each sample along said paths substantially in step with other aliquots of the same sample in other processing paths and in succession with the aliquots of other samples, with discontinuous motion in which there are alternate times of fluid advance along said path and of dwell therein at least nearly stationary, to provide with said dwell times further time for chemical reaction producing said manifestation.

27. In the automated constituent analysis of a plurality of fluid samples for a plurality of constituents wherein each sample is divided into a plurality of aliquots and the aliquots of each sample are processed in a plurality of chemical processing paths to manifest a detectable measure of the constituents present in each sample, and are then subjected to measurements of said constituents, the improvement comprising the steps of (A) dividing each sample substantially simultaneously into a number of aliquots, (B) delivering said sample aliquots substantially simultaneously to said plurality of chemical processing paths, (C) discontinuously moving each sample aliquot through its processing path, with alternate times of advance along said path and of dwell at least nearly stationary, to provide with said dwell times further time for chemical reaction to produce said manifestation, and (D) measuring said constituents in all aliquots of the same sample in a single time interval separate from the measurement intervals for other samples.

28. In automated fluid analyzing apparatus having chemical processing elements connected to form a plurality of fluid processing paths for receiving a plurality of aliquots of each of a succession of fluid samples and for chemically processing each aliquot of each sample to manifest a detectable measure of a material constituent therein, and having measuring apparatus for receiving the processed aliquots and for measuring said material constituent in each one, the improvement comprising (A) means for simultaneously dividing each sample into said plurality of aliquots, (B) means for supplying the aliquots of each sample substantially simultaneously to said plurality of fluid processing paths, (C) means operating said processing elements to move the aliquots of each sample along said path, in succession with the aliquots of other samples, with discontinuous motion in which there are alternate times of fluid advance along said path and of dwell therein at least nearly stationary, to provide with said dwell times further time for chemical reaction producing said manifestation, and (D) means operating said measuring apparatus to measure said material constituents in all aliquots of the same sample in a single time interval separate from the measurement intervals for other samples.

References Cited

UNITED STATES PATENTS

| | | | |
|---|---|---|---|
| 3,219,416 | 11/1965 | Natelson | 23—253 R |
| 3,575,692 | 4/1971 | Gilford | 23—259 |
| 3,475,127 | 10/1969 | Gilford | 23—230 R |
| 3,415,627 | 12/1968 | Rait | 23—253 R |
| 3,480,369 | 11/1969 | Smythe et al. | 23—253 R X |
| 3,479,141 | 11/1969 | Smythe et al. | 23—253 R X |
| 3,230,048 | 1/1966 | Skeggs | 23—253 R |

MORRIS O. WOLK, Primary Examiner

E. A. KATZ, Assistant Examiner

U.S. Cl. X.R.

23—253 R, 230 A, 253 A; 73—61.1 R, 61.3; 250—218; 356—39